(12) United States Patent
Okamoto (10) Patent No.: US 11,397,372 B2
(45) Date of Patent: Jul. 26, 2022

(54) MOLDED ARTICLE AND METHOD FOR MANUFACTURING MOLDED ARTICLE

(71) Applicant: MITSUBISHI ENGINEERING-PLASTICS CORPORATION, Tokyo (JP)

(72) Inventor: Fumihito Okamoto, Hiratsuka (JP)

(73) Assignee: MITSUBISHI ENGINEERING-PLASTICS CORPORATION, Tokyo (JP)

(*) Notice: Subject to any disclaimer, the term of this patent is extended or adjusted under 35 U.S.C. 154(b) by 390 days.

(21) Appl. No.: 16/473,575

(22) PCT Filed: Sep. 26, 2017

(86) PCT No.: PCT/JP2017/034700
§ 371 (c)(1),
(2) Date: Jun. 25, 2019

(87) PCT Pub. No.: WO2018/123171
PCT Pub. Date: Jul. 5, 2018

(65) Prior Publication Data
US 2019/0331984 A1 Oct. 31, 2019

(30) Foreign Application Priority Data

Dec. 27, 2016 (JP) .............................. JP2016-252601
Jun. 19, 2017 (JP) .............................. JP2017-119509

(51) Int. Cl.
| G03B 17/02 | (2021.01) |
| B29C 65/16 | (2006.01) |
| C08K 13/04 | (2006.01) |
| C08K 7/14 | (2006.01) |
| C08L 77/06 | (2006.01) |

(52) U.S. Cl.
CPC .......... *G03B 17/02* (2013.01); *B29C 65/1616* (2013.01); *C08K 7/14* (2013.01); *C08K 13/04* (2013.01); *C08L 77/06* (2013.01)

(58) Field of Classification Search
None
See application file for complete search history.

(56) References Cited

U.S. PATENT DOCUMENTS

| 2008/0004363 A1* | 1/2008 | Rosenberger ....... B29C 65/1677 522/2 |
| 2009/0233782 A1* | 9/2009 | Sasai ....................... C03C 3/068 501/78 |
| 2014/0094548 A1 | 4/2014 | Roth et al. |
| 2016/0145419 A1* | 5/2016 | Takano .................. C08K 5/098 524/607 |

FOREIGN PATENT DOCUMENTS

| CN | 101301788 A | 11/2008 | |
| CN | 105339434 A | 2/2016 | |
| JP | 44-2584 B1 | 2/1969 | |
| JP | 48-54176 A | 7/1973 | |
| JP | 48054176 A | * 8/1976 | |
| JP | 2005-139369 A | 6/2005 | |
| JP | 2005139369 A | * 6/2005 | |
| JP | 2008-266434 A | 11/2008 | |
| JP | 2008-308526 A | 12/2008 | |
| JP | 2008308526 A | * 12/2008 | ............ B29C 66/71 |
| JP | 2010-281962 A | 12/2010 | |
| JP | 2010-286544 A | 12/2010 | |
| JP | 2010281962 A | * 12/2010 | |
| JP | 2011-57237 A | 3/2011 | |
| JP | 2011057237 A | * 3/2011 | |
| JP | 2014-58604 A | 4/2014 | |
| JP | 2014-74150 A | 4/2014 | |
| JP | 2015-209521 A | 11/2015 | |
| JP | 2016-218139 A | 12/2016 | |
| JP | 2016218139 A | * 12/2016 | |
| WO | WO 2008/056534 A1 | 5/2008 | |

OTHER PUBLICATIONS

International Preliminary Report on Patentability and Written Opinion of the International Searching Authority(Forms PCT/IB/373 and PCT/ISA/237), dated Jul. 2, 2019, for International Application No. PCT/JP2017/034700, with an English Translation of the Written Opinion.
Korean Office Action dated Jul. 15, 2021, issued in corresponding Korean Patent Application No. 10-2019-7019438, with English machine translation.
Extended European Search Report for corresponding European Application No. 17889333.5, dated Aug. 28, 2020.
Chinese Office Action dated Nov. 30, 2020, issued in corresponding Chinese Patent Application No. 201780080756.3.
Korean Office Action dated Jan. 17, 2021, issued in corresponding Korean Patent Application No. 10-2019-7019438, with English machine translation.
Chinese Office Action dated Apr. 20, 2021, issued in corresponding Chinese Patent Application No. 201780080756.3, with partial English translation.

(Continued)

*Primary Examiner* — Robert T Butcher
(74) *Attorney, Agent, or Firm* — Birch, Stewart, Kolasch & Birch, LLP (57) ABSTRACT

Provided is a molded article which contains a first enclosure; a second enclosure adjoined with the first enclosure; and a transparent member held by the second enclosure, each of the first enclosure and the second enclosure being independently made from a resin composition that contains a polyamide resin having a semi-crystallization time of 10 to 60 seconds, and a melting point of 200 to 280° C., and the transparent member having a pencil hardness of 8H or larger, and a linear expansion coefficient of $1 \times 10^{-6}$ to $9 \times 10^{-6}$/° C., where the semi-crystallization time means a time measured by depolarization photometry at a temperature 20° C. higher than the melting point of the polyamide resin, for a melting time of polyamide resin of 5 minutes, and at a temperature of crystallization bath of 150° C.

22 Claims, 2 Drawing Sheets

(56) References Cited

OTHER PUBLICATIONS

Japanese Office Action dated Jun. 15, 2021, issued in corresponding Japanese Patent Application No. 2018-558818, with English machine translation.
Office Action dated Oct. 15, 2021 in corresponding Korean Patent Application No. 10-2019-7019438, with English translation.

\* cited by examiner

MOLDED ARTICLE AND METHOD FOR MANUFACTURING MOLDED ARTICLE

TECHNICAL FIELD

This invention relates to a molded article and a method for manufacturing the molded article, and in particular to a molded article suitable for a camera part, and, a method for manufacturing the molded article.

BACKGROUND ART

Polyamide resin, which is a representative engineering plastic, is easily workable, excels in mechanical characteristics, electric characteristics, heat resistance, and other physical and chemical characteristics, and is therefore widely used for parts of electric/electronic equipment and parts of other precision equipment.

For example, Patent Literature 1 discloses a barrel or holder of camera module, obtained by molding a polyamide composition with a content of polyamide (A) of 50 to 80% by mass and a content of fibrous reinforcing material (B) of 20 to 50% by mass, obtained by kneading the polyamide (A) that has a dicarboxylic acid unit containing 60 to 100 mol % of terephthalic acid unit, and a diamine unit containing 60 to 100 mol % of 1,9-diaminononane unit and/or 2-methyl-1,8-diaminooctane unit, with the fibrous reinforcing material (B), wherein the fibrous reinforcing material (B) has an average length, before being melt-kneaded, of 300 μm or shorter.

More recently, also intricately shaped molded articles have increasingly been manufactured using the polyamide resin. As shapes of the molded articles become more intricate, the molding articles have increasingly been formed by laser welding technique, for example.

Laser transmission welding is a technique for adjoining resin members, namely a laser transmissive (also referred to as non-absorptive, or less-absorptive) resin member (occasionally referred to as "transmissive resin member", hereinafter), and a laser-absorptive resin member (occasionally referred to as "absorptive resin member", hereinafter), by bringing them into contact and welding them. More specifically, laser light is irradiated on the adjoint surface through the transmissive resin member, so as to melt the absorptive resin member that composes the adjoint surface with the aid of energy of the laser light, and to weld them. The laser welding produces neither abrasion powder nor burr, and causes less damage on products. The polyamide resin per se has a relatively high laser transmittance. Hence the working of polyamide resin products using the laser welding technique has increasingly been attracting attention in these days. Such polyamide resin compositions for laser welding are described, for example, in Patent Literature 2 and Patent Literature 3.

CITATION LIST

Patent Literature

[Patent Literature 1] JP-A-2010-286544
[Patent Literature 2] JP-A-2008-308526
[Patent Literature 3] JP-A-2014-74150

SUMMARY OF THE INVENTION

Technical Problem

Figure 1:
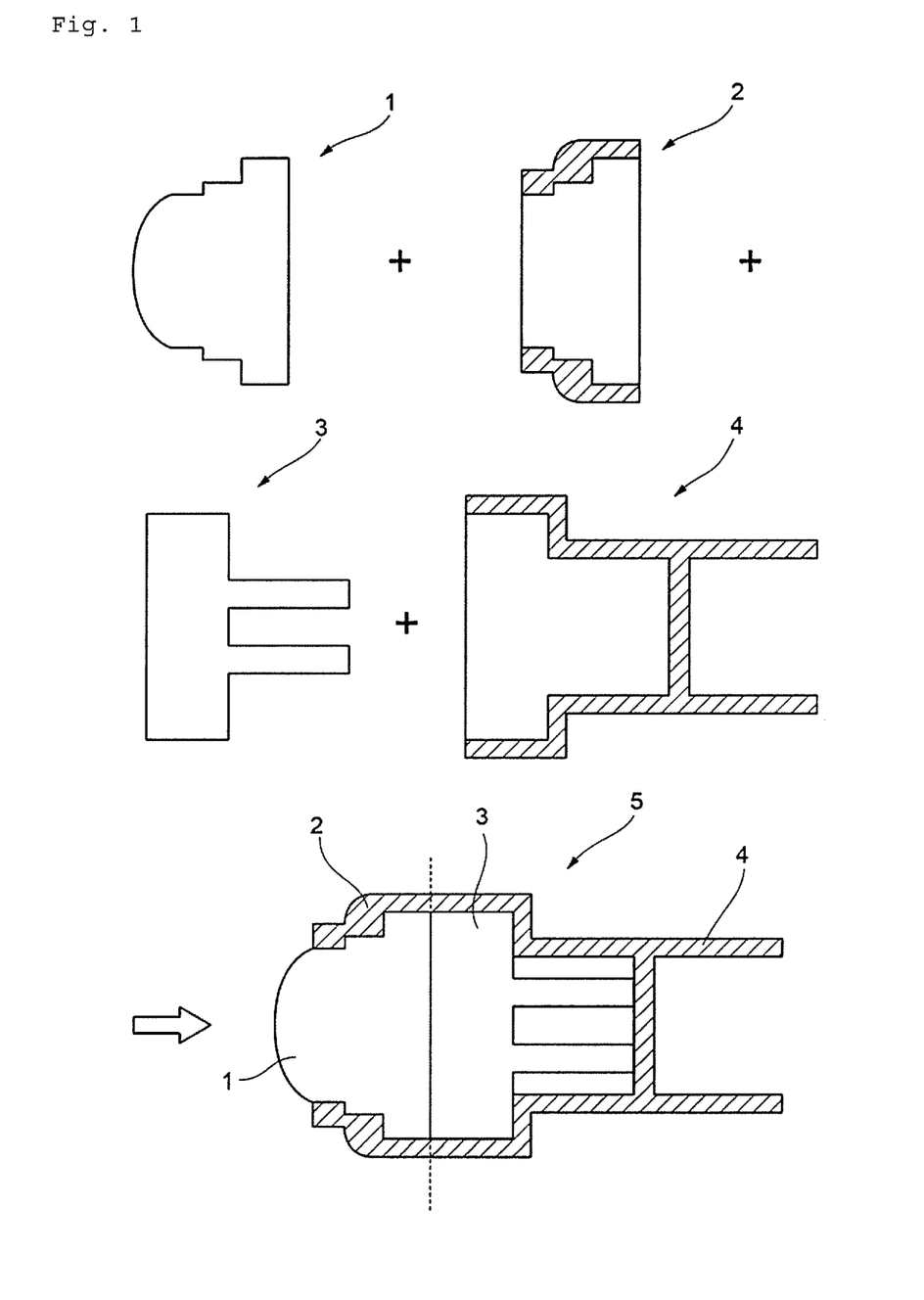
FIG. 1 A cross-sectional view illustrating an exemplary structure of a camera part.

Now typically as illustrated in FIG. 1, a camera part 5 is composed of a plurality of components, which include a lens holder made from resin 2 that holds a lens part 1, a connector 3, and a case made from resin 4 for holding connector. The camera part 5 illustrated in FIG. 1 is typically manufactured in such a way that holding the lens part 1 with the lens holder made from resin, holding the connector 3 with the case made from resin 4 for holding connector, and then adjoining the lens holder made from resin 2 and the case made from resin 4 for holding connector. The lens holder 2 and the case 4 for holding connector, both being made from resin, can be adjoined typically by laser welding, but can occasionally produce, during welding, a gap at the adjoint interface (indicated by dotted line in FIG. 1). The gap, if produced between the lens holder 2 and the case 4 for holding connector, will allow water to intrude therethrough, causing dewing or clouding of the lens part 1. Such adjoining failure may even result in poor appearance of the camera part 5.

This invention is aimed to solve the problems, and is to provide a molded article that includes a first enclosure made from resin, a second enclosure adjoined with the first enclosure made from resin, and a transparent member held by the second enclosure, causing no dewing or clouding of the transparent member, and shows good appearance of the adjoint part of the first enclosure and the second enclosure, as well as a method for manufacturing the molded article.

Solution to Problem

Considering the aforementioned problem, the present inventors conducted thorough investigations and succeeded in reducing the gap between the enclosures, by using a polyamide resin having a semi-crystallization time of 10 to 60 seconds at a temperature 20° C. higher than the melting point of the polyamide resin, enabling slow adjoining of the enclosures, which led us to complete this invention. More specifically, the aforementioned problems were solved by means <1> below, and preferably by means <2> to <11>.

<1> A molded article comprising: a first enclosure; a second enclosure adjoined with the first enclosure; and a transparent member held by the second enclosure, each of the first enclosure and the second enclosure being independently made from a resin composition that contains a polyamide resin having a semi-crystallization time of 10 to 60 seconds, and a melting point of 200 to 280° C., and the transparent member having a pencil hardness of 8H or larger, and a linear expansion coefficient of $1\times10^{-6}$ to $9\times10^{-6}$/° C., where the semi-crystallization time means a time measured by depolarization photometry at a temperature 20° C. higher than the melting point of the polyamide resin, for a melting time of polyamide resin of 5 minutes, and at a temperature of crystallization bath of 150° C.

<2> The molded article of <1>, wherein the polyamide resin comprises a diamine-derived structural unit and a dicarboxylic acid-derived structural unit, in which 50 mol % or more of the diamine-derived structural unit is originated from xylylenediamine, and 70 mol or more of the dicarboxylic acid-derived structural unit is originated from a straight-chain aliphatic α,ω-dicarboxylic acid having 4 to 20 carbon atoms.

<3> The molded article of <1> or <2>, wherein the polyamide resin contained in the first enclosure and the polyamide resin contained in the second enclosure have melting points, with a difference of 50° C. or smaller.

<4> The molded article of any one of <1> to <3>, wherein the first enclosure and the second enclosure independently contain fillers.

<5> The molded article of any one of <1> to <4>, wherein one of the first enclosure and the second enclosure contains a light-absorbing dye, and the other contains a light-transmitting dye.

<6> The molded article of any one of <1> to <5>, wherein the transparent member is composed of a glass.

<7> The molded article of any one of <1> to <6>, being a camera part.

<8> A method for manufacturing a molded article, the method comprising: adjoining a first enclosure and a second enclosure by heat welding, the second enclosure holding a transparent member, each of the first enclosure and the second enclosure being independently made from a resin composition that contains a polyamide resin having a semi-crystallization time of 10 to 50 seconds, and a melting point of 200 to 280° C., and the transparent member having a pencil hardness of 8H or larger, and a linear expansion coefficient of $1\times10^{-6}$ to $9\times10^{-6}/°$ C., where the semi-crystallization time means a time measured by depolarization photometry at a temperature 20° C. higher than the melting point of the polyamide resin, for a melting time of polyamide resin of 5 minutes, and at a temperature of crystallization bath of 150° C.

<9> The method for manufacturing a molded article of <8>, wherein the heat welding is laser welding.

<10> The method for manufacturing a molded article of <8> or <9>, wherein one of the first enclosure and the second enclosure contains a light-absorbing dye, and the other contains a light-transmitting dye.

<11> The method for manufacturing a molded article of any one of <8> to <10>, wherein the polyamide resins contained in the first enclosure and the polyamide resin contained in the second enclosure have melting points, with a difference of 50° C. or smaller.

Advantageous Effects of Invention

As for the molded article that includes a first enclosure made from resin, a second enclosure adjoined with the first enclosure, and a transparent member held by the second enclosure, it now became possible to provide a molded article causing no dewing or clouding of the transparent member, and, showing good appearance of the adjoint part of the first enclosure and the second enclosure, as well as to provide a method for manufacturing such molded article.

DESCRIPTION OF EMBODIMENTS

This invention will be detailed below. Note that all numerical ranges given in this specification, using "to" preceded and succeeded by numerals, are used to represent the ranges including these numerals respectively as the lower and upper limit values.

The molded article of this invention is featured by including a first enclosure; a second enclosure adjoined with the first enclosure; and a transparent member held by the second enclosure, each of the first enclosure and the second enclosure is independently made from a resin composition that contains a polyamide resin having a semi-crystallization time of 10 to 60 seconds, and a melting point of 200 to 280° C., and the transparent member has a pencil hardness of 8H or larger, and a linear expansion coefficient of $1\times10^{-6}$ to $9\times10^{-6}/°$ C. Note that the semi-crystallization time means a time measured by depolarization photometry at a temperature 20° C. higher than the melting point of the polyamide resin, for a melting time of polyamide resin of 5 minutes, and at a temperature of crystallization bath of 150° C.

According to this invention, heat welding in the process of adjoining the first enclosure and the second enclosure can be allowed to proceed slowly by using a polyamide resin having a relatively slow crystallization speed, thereby reducing the interfacial gap between the first enclosure and the second enclosure. Hence the molded article obtained by adjoining the first enclosure and the second enclosure will be less likely to suffer from water intrusion thereinto, less likely to cause dewing of the transparent member, and less likely to cause clouding. In addition, even if the interfacial gap between the first enclosure and the second enclosure should be small, a less orderly adjoint interface will pose a problem of poor appearance. In this invention, slow adjoining of the first enclosure and the second enclosure will make the interface orderly, and is successful to obtain a molded article with good appearance.

The molded article of this invention is applicable to a variety of storage containers, parts for electric/electronic equipment, parts for office automation (OA) equipment, parts for home electric appliances, parts for machines/mechanisms, and parts for vehicle mechanisms, which individually have a transparent member. The molded article of this invention is preferably a camera part, and more preferably a vehicle-borne camera part.

Note that the depolarization intensimetry is a method for measuring the degree of crystallization of resin, making use of a phenomenon such that light transmitting through a resin causes birefringence depending on crystallization. When an amorphous or molten resin is allowed to crystallize between a pair of crossed polarizing plates, the quantity of light that can transmit through the polarizing plates increases in proportion to the degree of crystallization. Quantity of transmitted light (intensity of transmitted light) is measured with a photodetector. The semi-crystallization time represents a time period during which the intensity of light transmitted through a resin, after being kept in an amorphous or molten state, reaches (I∞-I0)/2 (I0 represents intensity of transmitted light in an amorphous or molten state, and represents intensity of transmitted light after reaching a plateau), that is, the time required for the crystallization to advance halfway, providing an index for crystallization speed. The depolarization intensimetry is specifically conducted according to the description later in EXAMPLES.

In most cases, the molded article of this invention further has one or more members, in addition to the first enclosure, the second enclosure, and the transparent member. One example of such member is a connecter for a camera part.

The molded article of this invention preferably has, at least, a hollow structure isolated from the outside, which is formed by the first enclosure, the second enclosure and the transparent member. For example in a camera part 5 illustrated in FIG. 1, a case 4 which is made from resin for holding connector (corresponded to the first enclosure), a lens holder 2 which is made from resin (corresponded to the second enclosure), and a lens part 1 (corresponded to the transparent member) build up a hollow structure that holds a connector 3. The hollow structure is not always necessarily composed solely of the first enclosure, the second enclosure and the transparent member. The molded article of this invention may form a hollow structure isolated from the outside, including a third enclosure or member, in addition to the first enclosure, the second enclosure and the transparent member. In this case, also the third enclosure is preferably made from a resin composition containing the polyamide resin that satisfies the predetermined crystallization speed and melting point described above. The higher the hermeticity of the hollow structure, the more effectively the clouding or dewing of the transparent member may be suppressed.

<Resin Composition>

In this invention, the first enclosure and the second enclosure are independently made from a resin composition.

The resin composition used for forming the first enclosure, and the resin composition used for forming the second enclosure may be same or different.

In this invention, the resin composition used for forming the first enclosure, and the resin composition used for forming the second enclosure, preferably have chemical compositions in which 80% by mass or more and less than 100% by mass of the ingredients are common. In particular, the resin composition that forms one of the first enclosure and the second enclosure, and the resin composition that forms the other one, preferably have the polyamide resin compositions in which 80 to 100% by mass of the ingredients are common.

For the case where laser welding is employed, the resin composition that forms one of the first enclosure and the second enclosure preferably contains a light-absorbing dye. Meanwhile, the resin composition that forms the other enclosure more preferably contains a light-transmitting dye.

Although the method for manufacturing the resin composition is not specifically limited, a preferable method relates to use, as an extruder, of a single-screw or twin-screw extruder capable of devolatilization through a vent port. The polyamide resin and other optional ingredients to be mixed may be fed in a batch to the extruder, or the other ingredients to be mixed may sequentially be fed to the polyamide resin component. The filler is preferably fed at the middle of the extruder, in order to suppress the filler from being crushed during kneading. Alternatively, two or more ingredients, selected from the individual ingredients, may preliminarily be kneaded. For example, the light-transmitting dye may preliminarily be prepared in the form of master batch, and the master batch may be melt-kneaded with the residual ingredients to be mixed, then extruded, to obtain a predetermined ratio of mixing.

The first enclosure and the second enclosure, made from the resin composition, may be formed by any of known methods for forming widely used for thermoplastic resins, without special limitation. More specifically, applicable methods include injection molding, hollow molding, extrusion molding and press molding. Among them, injection molding is particularly preferable for its excellence of fluidity. In the injection molding, the resin temperature is preferably controlled to 240 to 300° C.

«Polyamide Resin»

The polyamide resin used in this invention has a semi-crystallization time of 10 to 60 seconds, and a melting point of 200 to 280° C. Within these ranges, the resin can be kept in a softened state for a long duration during welding, thus improving adjoining strength.

If the semi-crystallization time is shorter than 10 seconds, the resin will solidify earlier, and will fail to obtain appropriate contact strength. Meanwhile, if the semi-crystallization time exceeds 60 seconds, the resin will remain soft, and will hardly be pressurized appropriately during adjoining.

The semi-crystallization time of the polyamide resin will be measured following a method described later in EXAMPLES. If equipment and so forth described in EXAMPLES are no longer available due to discontinued production or the like, any of equipment with comparable performances are employable. The same will apply to other methods of measurement.

The resin composition used in this invention may contain only one type of polyamide resin, or may contain two or more types. For the case where the resin composition used in this invention contains two or more types of polyamide resin, the semi-crystallization time of polyamide resin in this invention is represented by a semi-crystallization time of the polyamide resin whose content is largest.

In this invention, the polyamide resin contained in the first enclosure and the polyamide resin contained in the second enclosure preferably, and independently, have a semi-crystallization time of 10 seconds or longer at minimum, preferably 20 seconds or longer, more preferably 25 seconds or longer, and even more preferably 30 seconds or longer. The semi-crystallization times are preferably, and independently, 60 seconds or shorter at maximum, preferably 55 seconds or shorter, more preferably 50 seconds or shorter, and even more preferably 45 seconds or shorter.

Within these ranges, welding strength at the interface between the first enclosure and the second enclosure may be improved.

The polyamide resin used in this invention has a melting point of 200 to 280° C. At or below the upper limit, the resin will advantageously be formable by injection molding in a relatively easy manner, so that only a low laser output in welding will suffice. Meanwhile, at or above the lower limit, the resin will be more conformable to heat resistance required for the enclosures. The melting point is preferably 205° C. or higher at minimum, and more preferably 210° C. or higher. The melting point is preferably 260° C. or lower at maximum, more preferably 250° C. or lower, and even more preferably 240° C. or lower.

The melting point of polyamide resin is measured according to a method described later in EXAMPLE. If equipment and so forth described in EXAMPLES are no longer available due to discontinued production or the like, any of equipment with comparable performances are employable.

For the case where the resin composition used in this invention contains two or more types of polyamide resin, the melting point of polyamide resin in this invention is represented by a melting point of the polyamide resin whose content is largest. For the case where the polyamide resin has two or more melting points, the melting point of polyamide resin in this invention is represented by the lowest melting point.

In this invention, the polyamide resin contained in the first enclosure and the polyamide resin contained in the second enclosure have melting points, with a difference of preferably 50° C. or smaller, more preferably 30° C. or smaller, even more preferably 20° C. or smaller, yet more preferably 10° C. or smaller, and furthermore preferably 5° C. or smaller. Within these ranges, interfacial gap between the first enclosure and the second enclosure may further be reduced. The difference of the melting points is preferably 0° C.

The polyamide resin used in this invention is not specifically limited in terms of the types, so long as the semi-crystallization time and the melting point are satisfied, allowing choice from a wide range of known polyamide resins. Among them, the polyamide resin used in this invention preferably includes a diamine-derived structural unit and a dicarboxylic acid-derived structural unit, in which 50 mol % or more of the diamine-derived structural unit is originated from xylylenediamine, and 70 mol % or more of the dicarboxylic acid-derived structural unit is originated from a straight-chain aliphatic α,ω-dicarboxylic acid having 4 to 20 carbon atoms (occasionally referred to as "XD-based polyamide", hereinafter).

In the XD-based polyamide, 50 mol % or more, preferably 70 mol % or more, more preferably 80 mol % or more, even more preferably 90 mol % or more, and yet more preferably 95 mol % or more of the diamine-derived structural unit is originated from xylylenediamine (preferably, at least either of metaxylylenediamine or paraxylylenediamine); and 70 mol % or more, preferably 80 mol % or more, more preferably 90 mol % or more, and yet more preferably 95 mol % or more of the dicarboxylic acid-derived structural unit is originated from the straight-chain aliphatic α,ω-dicarboxylic acid having 4 to 20 carbon atoms. In the XD-based polyamide used in this invention, preferably 30 mol % or more, more preferably 50 mol % or more, and even more preferably 60 mol % or more of the diamine-derived structural unit is metaxylylenediamine.

Diamines other than metaxylylenediamine and paraxylylenediamine, employable as starting diamine components for the XD-based polyamide, are exemplified by aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and aromatic ring-containing diamines such as bis(4-aminophenyl)ether, paraphenylenediamine, and bis(aminomethyl)naphthalene, from which one species may be used, or two or more species may be used in a mixed manner.

When diamines other than xylylenediamine are used as the diamine component, the ratio of consumption relative to the diamine-derived structural unit is less than 50 mol %, which is more preferably 30 mol % or less, more preferably 1 to 25 mol %, and even more preferably 5 to 20 mol %.

The straight-chain aliphatic α,ω-dicarboxylic acids having 4 to 20 carbon atoms, preferably used as the starting dicarboxylic acid component for the polyamide resin, are exemplified by aliphatic dicarboxylic acids such as succinic acid, glutaric acid, pimelic acid, suberic acid, azelaic acid, adipic acid, sebacic acid, undecanedioic acid, and dodecanedioic acid, from which one species may be used, of two or more species may be used in a combined manner. Among them, adipic acid or sebacic acid is preferable since the polyamide resin will have a melting point suitable for forming process. Sebacic acid is more preferable.

Dicarboxylic acid components, other than the straight-chain aliphatic α,ω-dicarboxylic acid having 4 to 20 carbon atoms, are exemplified by phthalic acid compounds such as isophthalic acid, terephthalic acid, and orthophthalic acid; and naphthalenedicarboxylic acid compounds such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid, from which one species may be used, of two or more species may be used in a combined manner.

When dicarboxylic acids other than the straight-chain aliphatic α,ω-dicarboxylic acid having 4 to 20 carbon atoms are used as the dicarboxylic acid component, it is preferable to use at least one of terephthalic acid or isophthalic acid, from the viewpoint of moldability and barrier performance, and is more preferable to use isophthalic acid. Ratio of the terephthalic acid and isophthalic acid, relative to the dicarboxylic acid structural unit, is preferably 30 mol % or less, more preferably falls in the range from 1 to 30 mol %, and even more preferably from 5 to 20 mol %. The description of JP-A-2005-002327 may be referred to for details.

In addition, as copolymerizable ingredients for composing the polyamide resin besides the diamine component and the dicarboxylic acid component, employable are lactams such as ε-caprolactam and laurolactam; and aliphatic aminocarboxylic acids such as aminocaproic acid and aminoundecanoic acid, without adversely affecting the effects of this invention.

Preferred polyamide resins used in this invention are exemplified by polyamide resin (MXD6I) composed of metaxylylenediamine, adipic acid and isophthalic acid; polyamide resin (MXD6) composed of metaxylylenediamine and adipic acid; polyamide resin (MP6) composed of metaxylylenediamine, paraxylylenediamine and adipic acid; polyamide resin (MXD10) composed of metaxylylenediamine and sebacic acid; and polyamide resin (MP10) composed of metaxylylenediamine, paraxylylenediamine and sebacic acid.

The polyamide resin used in this invention preferably has a number average molecular weight (Mn) of 6,000 to 30,000, which is more preferably 8,000 to 28,000, even more preferably 9,000 to 26,000, yet more preferably 10,000 to 24,000, and furthermore preferably 11,000 to 22,000. Within these ranges, the heat resistance, elastic modulus, dimensional stability, and moldability may further be improved.

Now the number average molecular weight (Mn) in this context is calculated by the equation below, using the terminal amino group concentration [$NH_2$] (microequivalent/g) and the terminal carboxy group concentration [COOH] (microequivalent/g) of the polyamide resin.

Number average molecular weight (Mn)=2,000,000/ ([COOH]+[$NH_2$])

The polyamide resin used in this invention preferably has a polydispersity (weight average molecular weight/number average molecular weight (Mw/Mn)) of 1.8 to 3.1. The polydispersity is more preferably 1.9 to 3.0, and even more preferably 2.0 to 2.9. With the polydispersity controlled within these ranges, a three-dimensional structure that excels in mechanical properties will more likely be obtained.

The polydispersity of polyamide resin is controllable, for example, by proper choices of types and amount of consumption of an initiator or catalyst used for polymerization, or polymerization conditions such as reaction temperature, pressure and time. Alternatively, the polydispersity may be controlled by mixing two or more types of polyamide resins obtained under different polymerization conditions and having different average molecular weights, or by subjecting the polymerized polyamide resin to fractional precipitation.

The polydispersity may be determined by GPC measurement, and may be measured specifically by using "HLC-8320GPC" as an apparatus from Tosoh Corporation, two "TSKgel Super HM-H" as columns from Tosoh Corporation, a 10 mmol/L sodium trifluoroacetate solution in hexafluoroisopropanol (HFIP), with a resin concentration of 0.02% by mass, at a column temperature of 40° C., at a flow rate of 0.3 mL/min, and using a refractive index detector (RI), and is given as a standard polymethyl methacrylate (PMMA) equivalent value. An analytical curve is prepared by dissolving PMMA in HFIP, with the concentration varied over 6 levels.

The polyamide resin used in this invention, when formed with a thickness of 1 mm, and allowed to stand under conditions of 40° C. and 90% relative humidity for 40 hours, preferably show a water permeability coefficient of 3.0 g·mm/day·m² or smaller. Although the lower limit value of the water permeability coefficient is preferably 0 g·mm/day·m², a level of 0.1 g·mm/day·m² or above, and even a level of 1.0 g·mm/day·m² or above will suffice for practical use. The water permeability coefficient is defined by values measured by the method described later in EXAMPLES.

Note that, low water absorption of the polyamide resin does not always mean small water permeability coefficient. This is because the polyamide resin shows different levels of rate of water absorption and rate of diffusion.

The resin composition used in this invention preferably contains 25% by mass or more of the polyamide resin, which is more preferably 30% by mass or more. The upper limit preferably falls under 100% by mass, which is preferably 90% by mass or below, more preferably 70% by mass or below, and even more preferably 60% by mass or below.

In the resin composition used in this invention, the total of the polyamide resin and a later-described filler preferably accounts for 90% by mass or more of the entirety.

«Other Polyamide Resin»

The resin composition used in this invention may contain one species, or two or more species of polyamide resin other than those described above. Such polyamide resin is exemplified by polyamide 4, polyamide 6, polyamide 11, polyamide 12, polyamide 46, polyamide 66, polyamide 610, polyamide 612, polyhexamethylene terephthalamide (polyamide 6T), polyhexamethylene isophthalamide (polyamide 6I), polyamide 66/6T, polyamide 9MT, and polyamide 6I/6T. It is, however, preferable that these polyamide resins are substantially not contained. "Substantially not contained" means that, in the resin composition used in this invention, the content is 2% by mass or less of the content of the polyamide resin that satisfies the aforementioned predetermined crystallization speed and the melting point, which is preferably 1% by mass or less, and more preferably 0.1% by mass or less.

«Filler»

The resin composition used in this invention may contain a filler. The filler may be an organic filler, or may be an inorganic filler. The inorganic filler is preferable.

The inorganic filler is exemplified by fillers capable of absorbing laser light, such as glass filler, carbon fiber, silica, alumina, and inorganic powders coated with laser-absorbing materials. Glass filler is preferable, and glass fiber is more preferable.

The glass filler is made from glass compositions such as A-glass, C-glass, E-glass, and S-glass. E-glass (non-alkali glass) is particularly preferable.

The glass fiber used in this invention may be a filament, or may be a product obtained by twisting a plurality of filaments.

The glass fiber may be in any forms including "glass roving" which is a continuous wound article of filament or a twisted product of a plurality of filaments, "chopped strand" equally cut into 1 to 10 mm long, and "milled fiber" ground into 10 to 500 μm long or around. Such glass fibers are marketed by Asahi Fiber Glass Co., Ltd. under the trade names "GLASRON chopped strand" and "GLASRON milled fiber", and are readily available.

In this invention, the glass fiber also preferably has a modified cross section. The modified cross section preferably has a flatness of 1.5 to 10, which is given by long diameter/short diameter (D2/D1), where D2 and D1 respectively represent the long diameter and short diameter of a cross-section normal to the length-wise direction of fiber. In particular, the flatness is preferably 2.5 to 10, more preferably 2.5 to 8, and particularly 2.5 to 5. For such flat glass, the description in paragraphs [0065] to [0072] of JP-A-2011-195820 may be referred to, the contents of which are incorporated by reference into this specification.

As the glass fiber used in this invention, preferable is a glass fiber having a weight average fiber diameter of 1 to 20 μm, and a cut length of 1 to 10 mm. For a glass fiber having a flat cross section, the weight average fiber diameter is calculated as a weight average fiber diameter of a circle having an equal area.

The glass fiber used in this invention may be sized with a sizing agent. The sizing agent in this case is preferably an acid-based sizing agent.

The glass filler in this invention may be a glass bead. The glass bead is a spherical article having an outer diameter of 10 to 100 μm, and is readily available for example from Potters-Ballotini Co., Ltd. marketed under the trade name "EGB731". Meanwhile, the glass flake is a flaky article having a thickness of 1 to 20 μm, and a length of one side of 0.05 to 1 mm, which is readily available for example from Nippon Sheet Glass Co., Ltd. under the trade name "Fleka".

The content of the filler in the resin composition used in this invention is preferably 25% by mass or more of the resin composition, which is more preferably 30% by mass or more. The upper limit value is preferably 70% by mass or below, more preferably 65% by mass or below, even more preferably 60% by mass or below, yet more preferably 55% by mass or below, further preferably 50% by mass or below, and still further preferably 45% by mass or below.

The resin composition used in this invention may contain only one species of filler, or may contain two or more species. When two or more species are contained, the total content preferably falls within the above-described ranges.

«Light-Transmitting Dye and Light-Absorbing Dye»

One of the resin compositions used in this invention preferably contains a light-absorbing dye. This design enables laser welding. The other one of the resin compositions used in this invention may contain a light-transmitting dye. With the light-transmitting dye contained therein, the first enclosure and the second enclosure may be laser welded more tightly.

The light-absorbing dye is exemplified by those having absorption wavelength within a wavelength range of laser light to be irradiated, typically within the range from 800 nm to 1100 nm. Specific examples include inorganic pigments (black pigments such as carbon black (for example, acetylene black, lamp black, thermal black, furnace black, channel black and Ketjen black), red pigments such as iron oxide red, orange pigment such as molybdate orange, and white pigment such as titanium oxide), and organic pigments (yellow pigments, orange pigments, red pigments, blue pigments, and green pigments). Among them, the inorganic pigments are preferable for their generally large concealability, and the black pigments are more preferable. Two or more of these light-absorbing dyes may be used in a combined manner.

The amount of mixing of the light-absorbing dye, when used, is preferably 0.01 to 1 part by mass, per 100 parts by mass of the resin component contained in the resin composition.

The light-transmitting dye is a dye showing high transmissivity within a wavelength range of laser light to be irradiated, typically within the range from 800 nm to 1100 nm. Specific examples include nigrosin, perinone, naphthalocyanine, anilin black, phthalocyanine, porphylin, perylene, quaterrylene, azo dye, anthraquinone, squaric acid derivatives, and immonium dye.

Commercially available examples include eBIND LTW-8731H, eBIND LTW-8701H and so forth, which are colorants from Orient Chemical Industries Co., Ltd. Alternatively, two or more chromatic dyes may be mixed to produce a blackish dye, and may be used.

The content of the light-transmitting dye, when mixed, is preferably 0.001% by mass or more of the resin composition, more preferably 0.006% by mass or more, even more preferably 0.018% by mass or more, and further may be 0.024% by mass or more, 0.030% by mass or more, and 0.050% by mass or more. The upper limit value is preferably 5.0% by mass or below, more preferably 2.0% by mass or below, even more preferably 1.0% by mass or below, and further may be 0.2% by mass or below, 0.1% by mass or below, and 0.06% by mass or below. Only one species of the light-transmitting dye may be contained, or two or more species may be contained. When two or more species are contained, the total content preferably falls within the above-described ranges.

«Other Resin Component»

The resin composition used in this invention may contain one species, or two or more species of other resin component, besides the polyamide resin. Such other resin employable here include polyester resins such as polyethylene terephthalate and polybutylene terephthalate; and thermoplastic resins such as polycarbonate resin and polyacetal resin.

The resin composition used in this invention may also be designed to contain substantially no resin other than the polyamide resin, and the content of which may be suppressed, for example, to 5% by mass or below of the total resin content in the composition, which may further be 1% by mass or below, and particularly 0.4% by mass or below.

«Talc»

The resin composition used in this invention may contain talc. In this invention, addition of talc may promote the crystallization.

The amount of mixing of talc in the resin composition used in this invention is preferably 0.05 to 20% by mass of the resin composition, more preferably 0.1 to 10% by mass, even more preferably 0.15 to 5% by mass, and yet more preferably 0.2 to 1.0% by mass. Only one species of talc may be used, or two or more species may be used in a combined manner. When using two or more species, the total content preferably falls within the above described ranges.

«Mold Releasing Agent»

The resin composition used in this invention may contain a mold releasing agent. The mold releasing agent is exemplified by aliphatic carboxylic acid, salt of aliphatic carboxylic acid, ester of aliphatic carboxylic acid and alcohol, aliphatic hydrocarbon compound with a number average molecular weight of 200 to 15,000, and polysiloxane-based silicone oil.

The aliphatic carboxylic acid is exemplified by saturated or unsaturated, aliphatic monovalent, divalent or trivalent carboxylic acids. Now the aliphatic carboxylic acid includes alicyclic carboxylic acids. Among them, preferred aliphatic carboxylic acids include monovalent or divalent carboxylic acids having 6 to 36 carbon atoms. Aliphatic saturated monovalent carboxylic acids having 6 to 36 carbon atoms are more preferable. Specific examples of the aliphatic carboxylic acid include palmitic acid, stearic acid, caproic acid, capric acid, lauric acid, arachic acid, behenic acid, lignoceric acid, cerotic acid, melissic acid, tetratriacontanic acid, montanic acid, adipic acid, and azelaic acid. The salt of aliphatic carboxylic acid is exemplified by sodium salt, potassium salt, calcium salt and magnesium salt.

The aliphatic carboxylic acid used in the ester of aliphatic carboxylic acid and alcohol may be same, for example, as the aforementioned aliphatic carboxylic acids. Meanwhile, the alcohol is exemplified by saturated or unsaturated, monohydric or polyhydric alcohols. These alcohols may have a substituent such as fluorine atom or aryl group. Among them, monohydric or polyhydric saturated alcohols having 30 or less carbon atoms are preferable; and aliphatic or alicyclic saturated monohydric alcohol or aliphatic saturated polyhydric alcohol having 30 or less carbon atoms are more preferable.

Specific examples of the alcohol include octanol, decanol, dodecanol, stearyl alcohol, behenyl alcohol, ethylene glycol, diethylene glycol, glycerin, pentaerythritol, 2,2-dihydroxyperfluoropropanol, neopentyl glycol, trimethylolpropane, di(trimethylolpropane), and dipentaerythritol.

Specific examples of the ester of aliphatic carboxylic acid and alcohol include beeswax (mixture mainly containing myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate.

The aliphatic hydrocarbon having a number average molecular weight of 200 to 15,000 is exemplified by liquid paraffin, paraffin wax, microwax, polyethylene wax, Fischer-Tropsch wax, and α-olefin oligomer having 3 to 12 carbon atoms. Note that the aliphatic hydrocarbon includes alicyclic hydrocarbon. The aliphatic hydrocarbon preferably has a number average molecular weight of 5,000 or smaller.

Among them, preferable are paraffin wax, polyethylene wax or partial oxide of polyethylene wax, and more preferable are paraffin wax and polyethylene wax.

For the case where the resin composition used in this invention contains a mold releasing agent, the content of the mold releasing agent, relative to the resin composition, is preferably 0.001 to 2% by mass, and is more preferably 0.01 to 1% by mass. Only one species of the mold releasing agent may be contained, or two or more species may be contained. When two or more species are contained, the total content preferably falls within the above-described ranges. With the content of the mold releasing agent fallen below the lower limits of these ranges, a mold releasing effect may occasionally be insufficient, whereas with the content of the mold releasing agent exceeding the upper limit values of these ranges, the hydrolysis resistance would degrade, and dies would be polluted during injection molding.

The resin composition used in this invention may contain other ingredients, besides the aforementioned ingredients, without departing from the spirit of this invention. Such other ingredients are exemplified by photostabilizer, antioxidant, flame retarder, UV absorber, fluorescent brightener, anti-dripping agent, antistatic agent, anti-clouding agent, lubricant, anti-blocking agent, fluidity improver, plasticizer, dispersion aid, and antibacterial agent. Among them, only one ingredient may be used, or two or more ingredients may be used together.

<Transparent Member>

The molded article of this invention contains a transparent member having a pencil hardness of 8H or larger, and a linear expansion coefficient of $1 \times 10^{-6}$ to $9 \times 10^{-6}/°$ C. Such transparent member composes, for example, a lens part of a camera part.

The pencil hardness of the transparent member is preferably 8H to 9H. The pencil hardness is a value measured in accordance with JIS K5600.

The linear expansion coefficient of the transparent member is preferably $5 \times 10^{-6}$ to $9 \times 10^{-6}/°$ C. The linear expansion coefficient is a value measured in accordance with JIS K7197.

Materials for composing the transparent member are exemplified by glass and resin. Glass is preferable.

The transparent member in this invention is held by the second enclosure. Mode of holding is exemplified by direct or indirect fitting of the transparent member with the second enclosure. The indirect fitting means a mode of fitting while placing a seal member in between.

Next, the method for manufacturing a molded article of this invention will be explained.

The method for manufacturing a molded article of this invention includes adjoining a first enclosure and a second enclosure by heat welding, the second enclosure includes heat-welding the first enclosure that holds a transparent member, and the second enclosure, the second enclosure holding a transparent member, each of the first enclosure and the second enclosure being independently made from a resin composition that contains a polyamide resin having a semi-crystallization time of 10 to 60 seconds, and a melting point of 200 to 280° C., with a difference of the melting points of 50° C. or smaller, the transparent member having a pencil hardness of 8H or larger, and a linear expansion coefficient of $1 \times 10^{-6}$ to $9 \times 10^{-6}/°$ C. The semi-crystallization time means a time measured by depolarization photometry at a temperature 20° C. higher than the melting point of the polyamide resin, for a melting time of polyamide resin of 5 minutes, and at a temperature of crystallization bath of 150° C.

As for the first enclosure, the second enclosure, the transparent member and the resin composition, the aforementioned description regarding the molded article, as well as the preferred ranges, may be referred to.

The manufacturing method of this invention includes heat welding of the first enclosure and the second enclosure. Methods for heat welding are not specifically limited so long as the methods can melt the adjoint part of the first enclosure and second enclosure under heating and can adjoin them. Laser welding is preferable.

Temperature of the heat welding is determined referring to the melting point of the polyamide resin and is preferably set 50 to 300° C. higher than the melting point of the polyamide resin. Now, the melting point of the polyamide resin is determined on the basis of the polyamide resin having the lowest melting point, among from the polyamide resins that are contained in the first enclosure and the second enclosure and satisfy the predetermined crystallization speeds and melting points.

<Method for Laser Welding>

A method for laser welding will be explained below. In this invention, the first enclosure and the second enclosure can be laser-welded to produce the molded article. In this case, one of the first enclosure and the second enclosure will be a transmissive resin member, and the other will be an absorptive resin member. Laser welding enables tight welding of the transmissive resin member and the absorptive resin member, without using an adhesive.

Morphology of the adjoint part of the first enclosure and the second enclosure, although not specifically limited, has at least a surface contact part (flat surface, curved surface) since the members are used after adjoined by laser welding. In the laser welding, a laser light that transmits through the transmissive resin member is absorbed by the absorptive resin member to melt it, thereby both members are welded. In this invention, since the first enclosure and the second enclosure adjoin slowly, so that good welding will be achieved. Thickness of the member through which the laser light transmits (thickness in the direction of laser transmission at a portion where the laser light transmits through) may properly be determined by considering applications, chemical ingredients of the resin composition and so forth, which is typically 5 mm or thinner, and preferably 4 mm or thinner.

Laser light source used for the laser welding is exemplified by fiber laser ($\lambda$=1070 nm), YAG (yttrium•aluminum•garnet crystal) laser ($\lambda$=1064 nm), and LD (laser diode) ($\lambda$=808, 840, 940 nm). In most cases, an optimal laser is selected by comprehensively taking beam quality (heat source), power stability, cost and so forth into account.

More specifically, for an exemplary case where the transmissive resin member and the absorptive resin member are welded, both members are first brought into contact with each other in their parts to be welded. Now the adjoint part of both members is preferably given by surface contact based on any combination of flat faces, curved faces, or flat and curved faces. Next, a laser light is irradiated through the transmissive resin member (preferably at an angle of 85 to 95° away from the weld surface). Now the laser light may be condensed onto the interface of both members, by optionally using a lens system. The condensed beam transmits through the transmissive resin member and is absorbed by the absorptive resin member in its surficial part, causing heat generation and melting. The heat then reaches also to the transmissive resin member by heat conduction, to form a molten pool at the interface of both members. The both members are bonded after cooled.

The molded article having the transmissive resin member and the absorptive resin member thus welded, has large bonding strength.

EXAMPLES

This invention will more specifically be explained referring to Examples. Materials, amounts of consumption, ratios, details of processes, and procedures of processes may suitably be modified without departing from the spirit of this invention. The scope of this invention is, therefore, by no means limited to the specific Examples below.

<Polyamide Resin>

(Synthesis of Polyamide (MXD6))

A polyamide resin was obtained referring to the description in paragraph [0038] of JP-A-2011-140620. The obtained polyamide resin will be denoted as "MXD6".

(Synthesis of Polyamide (MP10))

Into a reaction vessel equipped with a stirrer, a partial condenser, a total condenser, a thermometer, a dropping funnel, a nitrogen feeding tube, and a strand die, placed were precisely weighed 12,135 g (60 mol) of sebacic acid, 3.105 g (equivalent to 50 ppm by mass of phosphorus atom concentration in polyamide resin) of sodium hypophosphite monohydrate (NaH$_2$PO$_2$.H$_2$O), and 1.61 g of sodium acetate, followed by thorough replacement of the system with nitrogen gas, and heating up to 170° C. while stirring the system under a small flow rate of nitrogen gas. The molar ratio of sodium acetate and sodium hypophosphite monohydrate was set to 0.67.

To the content, 8,172 g (60 mol) of a 7:3 mixed diamine of meta-xylylenediamine and para-xylylenediamine was added dropwise under stirring, and the system was continuously heated while removing the released water out the system. After completion of dropwise addition of the mixed metaxylylenediamine, the inside temperature was kept at 260° C., and the melt polymerization reaction was allowed to proceed for 40 minutes.

Thereafter, the system was pressurized with nitrogen gas, the polymer was taken out through the strand die, and pelletized to obtain approximately 18 kg of a polyamide resin. The obtained polyamide was found to have a melting point of 215° C., a glass transition temperature of 64.4° C., a number average molecular weight of 14,286, a relative viscosity (measured in 96% sulfuric acid, a resin concentration of 1 g/100 cc, at 25° C.) of 2.09, a terminal amino group concentration of 60.0 microequivalent/g, and a terminal carboxy group concentration of 80.0 microequivalent/g.

(Synthesis of Polyamide (9T))

A polyamide resin mainly composed of terephthalic acid and 1,9-nonanediamine was synthesized, referring to the description in paragraph [0052] of JP-A-2010-286544. The obtained polyamide resin will be denoted as "9T". PA66: Polyamide 66, trade name "CM3001-N", from Toray Industries, Inc.

<Measurement of Water Permeability Coefficient>

Figure 2:
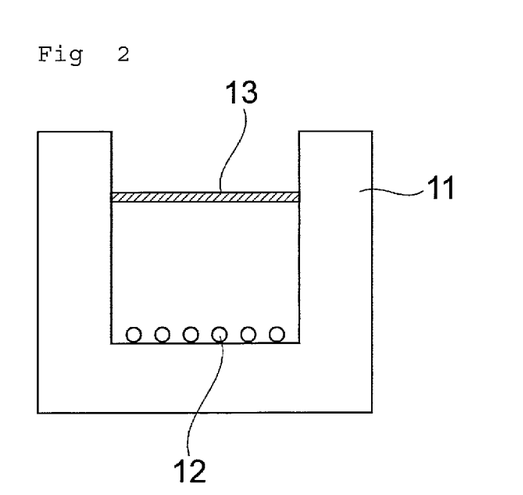
FIG. 2 A schematic drawing illustrating a measuring instrument for water permeability coefficient.

A film was formed using NEX80III-9E from Nissei Plastic Industrial Co., Ltd., equipped with dies with a cavity of 100 mm×100 mm×1 mm thick, at a cylinder temperature of 280° C., and a die surface temperature of 135° C. Next, as illustrated in FIG. 2, 25 g of calcium chloride grain 12 was placed in a cylindrical cup 11 made from aluminum, with an inner diameter of 67 mm, and an internal height of 80 mm. The cup was then closed with the film 13 of 1 mm thick, at a level of height 50 mm above from the inner bottom face, and allowed to stand still in an atmosphere of 40° C. and 90% relative humidity for 40 hours. The calcium chloride grain was weighed, and the difference (amount of increase) from the weight before being allowed to stand still was interpreted as the amount of permeated water, which was used to calculate the water permeability coefficient.

The water permeability coefficient was expressed in g·mm/day·m$^2$.

<Method for Measuring Semi-Crystallization Time>

The semi-crystallization time was measured by depolarization photometry at a temperature 20° C. higher than the melting point of the polyamide resin, for a melting time of polyamide resin of 5 minutes, and at a temperature of crystallization bath of 150° C. A semi-crystallization time analyzer employed here was Model MK701 from Kotaki Seisakusho Co., Ltd.

More specifically, the polyamide resin was melted at a temperature 20° C. higher than the melting point using a single screw extruder or the like, formed into a film of 100 μm thick at a chill roll temperature 5° C. lower than the glass transition temperature, the film was stacked to form five-layered film, allowed to melt in a hot air atmosphere at a temperature 20° C. higher than the melting point of the polyamide resin for 3 minutes, and then allowed to crystallize on an oil bath at 150° C., during which a time required for half crystallization was measured by the depolarization photometry.

The semi-crystallization time was expressed in second.

<Measurement of Melting Point>

The melting point was measured by DSC (differential scanning calorimetry), and defined by a peak-top temperature of endthermic peak observed at a process of temperature rising. The measurement was conducted using a DSC analyzer, approximately 1 mg of sample, and nitrogen gas as an atmospheric gas fed at 30 mL/min. The sample was heated, for melting, from room temperature at a heating rate of 10° C./min, up to an expected melting point or above during which the melting point was determined on the basis of a temperature at which the endothermic peak was observed to fall deepest.

The DSC analyzer used here was DSC-60 from Shimadzu Corporation.

The melting point was expressed in ° C. [0069]

TABLE 1

| Polyamide Resin | Water Permeability Coefficient (g · mm/day · m$^2$) | Melting Point (° C.) | Semi-Crystallization Time (Second) |
|---|---|---|---|
| MXD6 | 3.0 | 240 | 45 |
| MP10 | 2.4 | 215 | 30 |
| 9T | 0.9 | 306 | 4 |
| PA66 | 4.5 | 265 | 3 |

<Filler>

T756H: glass fiber, ECS03T-756H (trade name) from Nippon Electric Glass Co., Ltd., weight average fiber diameter=10.5 μm, cut length=3 to 4 mm <Light-Transmitting Dye>

8731H: eBIND LTW-8731H (trade name) from Orient Chemical Industries, Ltd., master batch of polyamide 66 and light-transmitting dye <Light-Absorbing Dye>

Carbon black (MA600B, from Mitsubishi Chemical Corporation)

<Talc>

Micron White #5000S: from Hayashi Kasei Co., Ltd.

<Mold Releasing Agent>

Light Amide WH255: from Kyoeisha Chemical Co., Ltd.

Example 1

<Manufacture of Light-Transmitting Enclosure>

«Production of Resin Composition»

Polyamide resin, talc, mold releasing agent and light-transmitting dye listed in Table 2 were individually weighed precisely, dry-blended, and then fed into a twin screw extruder (TEM26SS, from Toshiba Machine Co., Ltd.) from the base of the screws, using a twin screw cassette weighing feeder (CE-W-1-MP, from Kubota Corporation). Glass fiber listed in Table 2 was fed from the side of the aforementioned twin screw extruder using a vibrating cassette weighing feeder (CE-V-1B-MP, from Kubota Corporation), melt-kneaded with the resin component and so forth, and then pelletized. Temperature of the extruder was set to 280° C.

TABLE 2

| | Product Name | Amount (parts by mass) |
|---|---|---|
| Polyamide Resin | MP 10 | 67.4 |
| Glass Fiber | T 756H | 30.0 |
| Talc | Micron White #5000S | 0.3 |
| Release Agent | Light Amide WH255 | 0.3 |
| Light-Transmitting Dye | 8731H | 2.0 |

«Molding of Light-Transmitting Enclosure»

Pellets obtained above were subjected to molding using an injection molding machine (SE50D, from Sumitomo Heavy Industries, Ltd.), at a cylinder temperature of 280° C., and a die surface temperature of 110° C.

<Manufacture of Light-Absorbing Enclosure>
«Production of Resin Composition»

Polyamide resin, talc, mold releasing agent and light-absorbing dye listed in Table 3 were individually weighed precisely, dry-blended, and then fed into a twin screw extruder (TEM26SS, from Toshiba Machine Co., Ltd.) from the base of the screws, using a twin screw cassette weighing feeder (CE-W-1-MP, from Kubota Corporation). The light-absorbing dye listed in Table 3 was fed in the form of master batch prepared by using a part of the polyamide resin, within the amount listed in Table 3. Glass fiber listed in Table 3 was fed from the side of the aforementioned twin screw extruder using a vibrating cassette weighing feeder (CE-V-1B-MP, from Kubota Corporation), melt-kneaded with the resin component and so forth, and then pelletized. Temperature of the extruder was set to 280° C.

TABLE 3

| | Product Name | Amount (parts by mass) |
|---|---|---|
| Polyamide Resin | MP 10 | 67.4 |
| Glass Fiber | T756H | 30.0 |
| Talc | Micron White #5000S | 0.3 |
| Release Agent | Light Amide WH255 | 0.3 |
| Light-Absorbing Dye | Carbon Black | 2.0 |

«Molding of Light-Absorbing Enclosure»

Pellets obtained above were subjected to molding using an injection molding machine (SE50D, from Sumitomo Heavy Industries, Ltd.), at a cylinder temperature of 280° C., and a die surface temperature of 110° C.

<Laser Welding>

The light-transmitting enclosure obtained above, fitted with a glass lens as the transparent member, was laser-welded with the light-absorbing enclosure. The light-transmitting enclosure and the light-absorbing enclosure were stacked, and irradiated by laser through the light-transmitting enclosure. The glass lens has a pencil hardness of 8H, and a linear expansion coefficient of approximately $8.5 \times 10^{-6}$. Laser irradiation employed a wavelength of the laser light of 940 nm (semiconductor laser), a diameter of welding spot of 2.0 mm, and a length of welding of 20 mm. Also employed were a scanning speed of laser light of 5 mm/second, a laser output of 13 W, and a clamping pressure of 0.5 MPa.

A laser welding apparatus employed here was a scanning type Park Laser System from Parker Corporation.

<Clouding or Dewing>

The obtained molded article was allowed to stand still in an environment of 40° C. and 90% relative humidity for 40 hours, and clouding and dewing were visually observed.
A: dewing and clouding not observed
B: at least one of dewing or clouding was observed
<Appearance>

The interface between the light-absorbing enclosure and the light-transmitting enclosure in the obtained molded article was visually observed.
A: interface found to be orderly
B: other than "A" above Example 2, Comparative Example 1 and Comparative Example 2

The processes were conducted in the same way as in Example 1, except that the polyamide resins used for the light-absorbing enclosure and the light-transmitting enclosure were respectively replaced by the polyamide resins listed in Table 4.

Example 3

<Manufacture of Light-Absorbing Enclosure>
«Production of Resin Composition»

Polyamide resin, talc, mold releasing agent and light-absorbing dye listed in Table 3 were individually weighed precisely, dry-blended, and then fed into a twin screw extruder (TEM26SS, from Toshiba Machine Co., Ltd.) from the base of the screws, using a twin screw cassette weighing feeder (CE-W-1-MP, from Kubota Corporation). The light-absorbing dye listed in Table 3 was fed in the form of master batch prepared by using a part of the polyamide resin, within the amount listed in Table 3. Glass fiber listed in Table 3 was fed from the side of the aforementioned twin screw extruder using a vibrating cassette weighing feeder (CE-V-1B-MP, from Kubota Corporation), melt-kneaded with the resin component and so forth, and then pelletized. Temperature of the extruder was set to 280° C.

«Molding of Light-Absorbing Enclosure»

Pellets obtained above were subjected to molding using an injection molding machine (SE50D, from Sumitomo Heavy Industries, Ltd.), at a cylinder temperature of 280° C., and a die surface temperature of 110° C.

<Manufacture of Light-Transmitting Enclosure>
«Production of Resin Composition»

Polyamide resin, talc, mold releasing agent and light-transmitting dye listed in Table 2 were individually weighed precisely, dry-blended, and then fed into a twin screw extruder (TEM26SS, from Toshiba Machine Co., Ltd.) from the base of the screws, using a twin screw cassette weighing feeder (CE-W-1-MP, from Kubota Corporation). Glass fiber listed in Table 2 was fed from the side of the aforementioned twin screw extruder using a vibrating cassette weighing feeder (CE-V-1B-MP, from Kubota Corporation), melt-kneaded with the resin component and so forth, and then pelletized. Temperature of the extruder was set to 280° C.

«Molding of Light-Transmitting Enclosure»

Pellets obtained above were subjected to molding using an injection molding machine (SE50D, from Sumitomo Heavy Industries, Ltd.), at a cylinder temperature of 280° C., and a die surface temperature of 110° C.

<Laser Welding>

The light-transmitting enclosure obtained above, fitted with a glass lens as the transparent member, was laser-welded with the light-absorbing enclosure. The light-transmitting enclosure and the light-absorbing enclosure were stacked, and irradiated by laser through the light-transmitting enclosure. The glass lens has a pencil hardness of 8H, and a linear expansion coefficient of approximately $8.5 \times 10^{-6}$. Laser irradiation employed a wavelength of the laser light of 940 nm (semiconductor laser), a diameter of welding spot of 2.0 mm, and a length of welding of 20 mm. Also employed were a scanning speed of laser light of 5 mm/second, a laser output of 13 W, and a clamping pressure of 0.5 MPa.

A laser welding apparatus employed here was a scanning type Park Laser System from Parker Corporation.

The thus obtained molded articles were evaluated regarding <Clouding or Dewing> and <Appearance> in the same way as in Example 1.

Example 4

The processes were conducted in the same way as in Example 3, except that the polyamide resin used for the light-absorbing enclosure and the light-transmitting enclosure was replaced by the polyamide resin listed in Table 4.

TABLE 4

|  | Example 1 | Example 2 | Comparative Example 1 | Comparative Example 2 | Example 3 | Example 4 |
|---|---|---|---|---|---|---|
| Polyamide Resin | MP 10 | MXD 6 | 9T | PA 66 | MP 10 | MXD 6 |
| Clouding or Dewing | A | A | B | B | A | A |
| Appearance | A | A | B | B | A | A |

As is clear from the results above, for the cases where the polyamide resins that satisfy the predetermined melting point and crystallization speed were used (Examples 1, 2, 3 and 4), the molded articles showed no clouding or dewing, and showed good appearance. In contrast, for the cases where the melting point and the semi-crystallization time fell outside the scope of this invention (Comparative Examples 1 and 2), the clouding or dewing was found, and the appearances were found to be poor.

REFERENCE SIGNS LIST 1 lens part
2 lens holder made from resin
3 connector
4 case made from resin for holding connector
5 camera part
11 cup
12 calcium chloride grain
13 film of 1 mm thick

The invention claimed is:

1. A molded article comprising:
a first enclosure;
a second enclosure adjoined with the first enclosure; and
a transparent member held by the second enclosure,
each of the first enclosure and the second enclosure being independently made from a resin composition that contains a polyamide resin having a semi-crystallization time of 10 to 60 seconds, and a melting point of 200 to 280° C., and
the transparent member having a pencil hardness of 8H or larger, and a linear expansion coefficient of $1 \times 10^{-6}$ to $9 \times 10^{-6}$/° C.,
where the semi-crystallization time means a time measured by depolarization photometry at a temperature 20° C. higher than the melting point of the polyamide resin, for a melting time of polyamide resin of 5 minutes, and at a temperature of crystallization bath of 150° C., and
where the molded article has a hollow structure isolated from an outside, which is formed by at least the first enclosure, the second enclosure and the transparent member.

2. The molded article of claim 1, wherein the polyamide resin comprises a diamine-derived structural unit and a dicarboxylic acid-derived structural unit; in which 50 mol % or more of the diamine-derived structural unit is originated from xylylenediamine, and 70 mol % or more of the dicarboxylic acid-derived structural unit is originated from a straight-chain aliphatic α,ω-dicarboxylic acid having 4 to 20 carbon atoms.

3. The molded article of claim 1, wherein the polyamide resin contained in the first enclosure and the polyamide resin contained in the second enclosure have melting points, with a difference of 50° C. or smaller.

4. The molded article of claim 1, wherein the first enclosure and the second enclosure independently contain fillers.

5. The molded article of claim 1, wherein one of the first enclosure and the second enclosure contains a light-absorbing dye, and the other contains a light-transmitting dye.

6. The molded article of claim 1, wherein the transparent member is composed of a glass.

7. The molded article of claim 1, being a camera part.

8. The molded article of claim 2, wherein the polyimide resin contained in the first enclosure and the polyamide resin contained in the second enclosure have melting points, with a difference of 50° C. or smaller.

9. The molded article of claim 2, wherein the first enclosure and the second enclosure independently contain fillers.

10. The molded article of claim 2, wherein one of the first enclosure and the second enclosure contains a light-absorbing dye, and the other contains a light-transmitting dye.

11. The molded article of claim 3, wherein the first enclosure and the second enclosure independently contain fillers.

12. The molded article of claim 3, wherein one of the first enclosure and the second enclosure contains a light-absorbing dye, and the other contains a light-transmitting dye.

13. The molded article of claim 3, wherein the transparent member is composed of a glass.

14. The molded article of claim 4, wherein one of the first enclosure and the second enclosure contains a light-absorbing dye, and the other contains a light-transmitting dye.

15. The molded article of claim 4, wherein the transparent member is composed of a glass.

16. The molded article of claim 2, wherein the polyamide resin contained in the first enclosure and the polyamide resin contained in the second enclosure have melting points, with a difference of 50° C. or smaller;
wherein the first enclosure and the second enclosure independently contain fillers; and one of the first enclosure and the second enclosure contains a light-absorbing dye, and the other contains a light-transmitting dye.

17. A method for manufacturing the molded article according to claim 1, the method comprising:
adjoining a first enclosure and a second enclosure by heat welding,
the second enclosure holding a transparent member,
each of the first enclosure and the second enclosure being independently made from a resin composition that contains a polyamide resin having a semi-crystallization time of 10 to 50 seconds, and a melting point of 200 to 280° C., and
the transparent member having a pencil hardness of 8H or larger, and a linear expansion coefficient of $1\times10^{-6}$ to $9\times10^{-6}/°$ C.,
where the semi-crystallization time means a time measured by depolarization photometry at a temperature 20° C. higher than the melting point of the polyamide resin, for a melting time of polyamide resin of 5 minutes, and at a temperature of crystallization bath of 150° C.

18. The method for manufacturing a molded article of claim 17, wherein the heat welding is laser welding.

19. The method for manufacturing a molded article of claim 17, wherein one of the first enclosure and the second enclosure contains a light-absorbing dye, and the other contains a light-transmitting dye.

20. The method for manufacturing a molded article of claim 17, wherein the polyamide resins contained in the first enclosure and the polyamide resin contained in the second enclosure have melting points, with a difference of 50° C. or smaller.

21. A molded article comprising:
a first enclosure;
a second enclosure adjoined with the first enclosure; and
a transparent member held by the second enclosure,
each of the first enclosure and the second enclosure being independently made from a resin composition that contains a polyamide resin having a semi-crystallization time of 10 to 60 seconds, and a melting point of 200 to 280° C., and
the transparent member having a pencil hardness of 8H or larger, and a linear expansion coefficient of $1\times10^{-6}$ to $9\times10^{-6}/°$ C.,
where the semi-crystallization time means a time measured by depolarization photometry at a temperature 20° C. higher than the melting point of the polyamide resin, for a melting time of polyamide resin of 5 minutes, and at a temperature of crystallization bath of 150° C., and where the first enclosure has a connector.

22. The molded article of claim 1, wherein the first enclosure has a connector.

* * * * *